United States Patent
Ma et al.

(10) Patent No.: US 10,769,743 B2
(45) Date of Patent: Sep. 8, 2020

(54) METHOD, DEVICE AND NON-TRANSITORY STORAGE MEDIUM FOR PROCESSING CLOTHES INFORMATION

(71) Applicant: BEIJING XIAOMI MOBILE SOFTWARE CO., LTD., Beijing (CN)

(72) Inventors: Xuan Ma, Beijing (CN); Dian Fan, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 52 days.

(21) Appl. No.: 16/132,350

(22) Filed: Sep. 14, 2018

(65) Prior Publication Data

US 2019/0095746 A1  Mar. 28, 2019

(30) Foreign Application Priority Data

Sep. 28, 2017  (CN) .......................... 2017 1 0898699

(51) Int. Cl.
*G06Q 99/00*  (2006.01)
*A47B 67/00*  (2006.01)
*A47B 61/00*  (2006.01)

(52) U.S. Cl.
CPC .............. *G06Q 99/00* (2013.01); *A47B 61/00* (2013.01); *A47B 67/00* (2013.01)

(58) Field of Classification Search
None
See application file for complete search history.

(56) References Cited

U.S. PATENT DOCUMENTS

| | | | |
|---|---|---|---|
| 2007/0225859 A1* | 9/2007 | Kolesnychenko ... | G06Q 10/087 700/216 |
| 2009/0116698 A1 | 5/2009 | Zhang | |
| 2016/0321547 A1* | 11/2016 | Johnson ............... | G06Q 10/087 |
| 2017/0011452 A1* | 1/2017 | Beckham ............... | G06Q 20/18 |
| 2017/0187669 A1 | 6/2017 | Do et al. | |

(Continued)

FOREIGN PATENT DOCUMENTS

| CN | 106649383 A | 5/2017 |
|---|---|---|
| CN | 106897327 A | 6/2017 |

(Continued)

OTHER PUBLICATIONS

First Office Action of Chinese Patent Application No. 201710898699. 1, dated Jul. 2, 2019 and English translation, (17p).

(Continued)

*Primary Examiner* — Justin P. Misleh
(74) *Attorney, Agent, or Firm* — Arch & Lake LLP

(57) ABSTRACT

The present disclosure relates to a method, a device and a non-transitory computer storage medium for processing clothes information. The method includes: acquiring a number of wearing times for each piece of clothes in a clothes library within a preset time period, where the clothes library comprises a collection of information on clothes worn that is captured using a dressing mirror, and the number of wearing times is a counted number of times for each piece of clothes worn; determining clothes to be handled from the clothes according to the number of wearing times for each piece of clothes; and generating first prompt information for prompting to handle the clothes to be handled.

15 Claims, 9 Drawing Sheets

(56) References Cited

U.S. PATENT DOCUMENTS

2017/0277365 A1* 9/2017 Gaidar .................... G06F 3/167
2018/0182016 A1* 6/2018 Giampaolo ........ G06Q 30/0631

FOREIGN PATENT DOCUMENTS

CN  106980485 A  7/2017
CN  107080435 A  8/2017

OTHER PUBLICATIONS

Extended European Search Report of European Patent Application No. 181976440, from the European Patent office, dated Dec. 5, 2018, 8 pages.
Second Office Action of Chinese Patent Application No. 201710898699.1, dated May 12, 2020 and English translation, (21p).

* cited by examiner

METHOD, DEVICE AND NON-TRANSITORY STORAGE MEDIUM FOR PROCESSING CLOTHES INFORMATION

CROSS-REFERENCE TO RELATED APPLICATION

This application is based upon and claims priority to Chinese patent application No. 201710898699.1 filed Sep. 28, 2017, the entire content of which is incorporated herein by reference in its entirety for all purposes.

TECHNICAL FIELD

The present disclosure relates to the field of data processing, and more particularly, to a method, a device and a non-transitory computer storage medium for processing clothes information.

BACKGROUND

With the improvement of living standards, users may purchase a lot of clothes. Under normal circumstances, users put the clothes in a wardrobe for selection. However, due to the number of clothes possessed by a user, especially for a female user, favorite clothes may be placed at some corners of the wardrobe and may be forgotten by the user, or clothes to be discarded may be left in the wardrobe and taking up a lot of space.

SUMMARY

Examples of the present disclosure provide a method, a device and a non-transitory computer storage medium for processing clothes information.

According to a first aspect of the examples of the present disclosure, there is provided a method for processing clothes information. The method includes: acquiring a number of wearing times for each piece of clothes in a clothes library within a preset time period, where the clothes library may include a collection of information on clothes worn that is captured using a dressing mirror, and the number of wearing times is a counted number of times for each piece of clothes worn; identifying clothes to be handled according to the number of wearing times for each piece of clothes; and generating first prompt information for prompting to handle the identified clothes.

According to a second aspect of the examples of the present disclosure, there is provided a device for processing clothes information. The device includes: a processor; and a memory for storing instructions executable by the processor; where the processor may be configured to: acquire a number of wearing times for each piece of clothes in a clothes library within a preset time period, where the clothes library may include a collection of information on clothes worn that is captured using a dressing mirror, and the number of wearing times is a counted number of times for each piece of clothes; identify clothes to be handled according to the number of wearing times for each piece of clothes; and generate first prompt information for prompting to handle the identified clothes.

According to a third aspect of the examples of the present disclosure, there is provided a non-transitory computer readable storage medium having stored thereon a computer program that, when being executed by a processor, performs acquiring a number of wearing times for each piece of clothes in a clothes library within a preset time period, where the clothes library may include a collection of information on clothes worn that is captured using a dressing mirror, and the number of wearing times is a counted number of times for each piece of clothes worn; identifying clothes to be handled according to the number of wearing times for each piece of clothes; and generating first prompt information for prompting to handle the identified clothes.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate examples consistent with the disclosure and, together with the description, serve to explain the principles of the disclosure.

DETAILED DESCRIPTION

Reference will now be made in detail to examples, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the disclosure. Instead, they are merely examples of apparatuses and methods consistent with aspects related to the disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Figure 1:
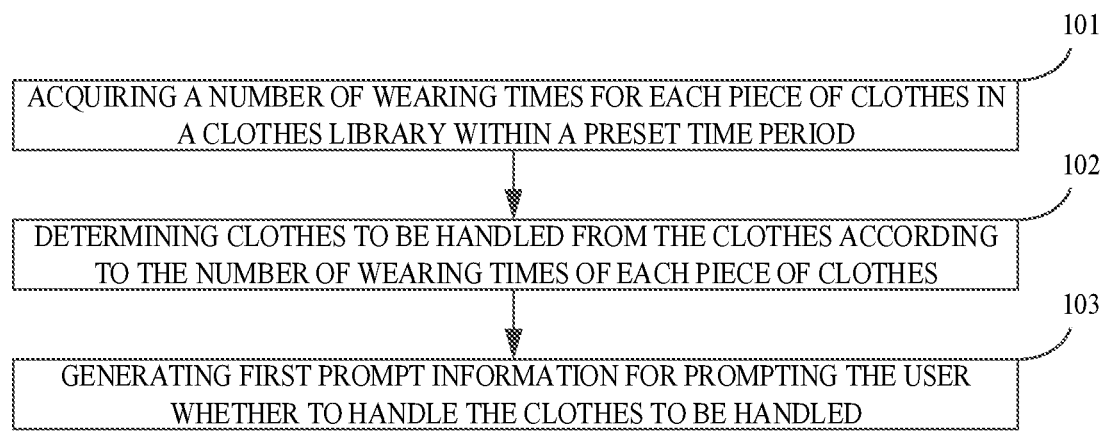
FIG. 1 is a flowchart illustrating a method for processing clothes information according to an example.

FIG. 1 is a flowchart illustrating a method for processing clothes information according to an example. As shown in FIG. 1, the method for processing clothes information is performed in a device for processing clothes information, and the device may be applied in a dressing mirror, or may be applied in other terminal, such as a mobile phone, a computer, and the like. The method may include the following steps 101-103.

In step 101, a number of wearing times of each piece of clothes in a clothes library within a preset period is acquired.

Here, the clothes library is a collection of information on clothes worn by a user captured by the dressing mirror; and the number of wearing times is a counted number of times of each piece of clothes being recognized as worn by the user.

The clothes library is a data base configured to store an image (or a feature) of each piece of clothes and a number of wearing times of the piece of clothes.

The preset period may be a time period of months, quarters, years, etc. In the example, clothes may include coats, trousers, shoes, socks, and all other clothes worn by the user, and may also include accessories such as earrings, necklaces, hair bands and the like.

The wearing times of each piece of clothes in this example may be presented in a form of a table.

In step 102, clothes to be handled are determined from the clothes according to the number of wearing times of each piece of clothes.

The clothes to be handled can be determined according to the number of wearing times. For example, a piece of clothes that has been worn for a very small number of wearing times may be taken as the clothes to be handled. A small number of wearing times for clothes indicates that the user wears them infrequently. Such clothes may be clothes that the user forgets to wear, or may be clothes that the user wants to discard. Alternatively, clothes that have been worn for a very large number of wearing times may be taken as the clothes to be handled. Clothes with a big number of wearing times are more likely to be damaged or the like.

In step 103, first prompt information for prompting the user whether to handle the clothes to be handled is generated.

In this example, clothes information captured by the dressing mirror is acquired; a number of wearing times of each piece of clothes is counted; based on the number of wearing times, clothes to be handled is determined; and the user is prompted. In this way, it can not only timely notify the user about the wearing situation of the clothes, but also can facilitate the user to take appropriate handling measures on the clothes to be handled.

In one example, after step 103, the method further includes:

receiving a prompt feedback input by the user; when the prompt feedback indicates discard or donation of the clothes to be handled, removing the clothes to be handled from the clothes library, and clearing records of the clothes to be handled; and when the prompt feedback indicates retention of the clothes to be handled, retaining the records of the clothes to be handled.

After the prompt feedback indicates the retention of the clothes to be handled, some collocation suggestions may be provided. The collocation suggestions give several examples of collocation of clothes with the clothes to be handled.

In one example, the method further includes:

when the prompt feedback indicates donation of the clothes to be handled, generating second prompt information, wherein the second prompt information prompts the user of information about a donation channel.

Here, the information about a donation channel may include a phone number for donation consultation, an address for mailing donation, so that the user can donate the clothes to be handled.

In one example, step 102 may include:

determining a current climate condition; selecting a piece of infrequently worn clothes, that meets the current climatic condition and has a number of wearing times less than a preset number of times, from the clothes; and determining the piece of infrequently worn clothes as the clothes to be handled.

A piece of clothes that merely has a number of wearing times less than a preset number of times may be a piece of clothes that may not be clothes for worn during the season. For example, the user does not wear a down jacket in summer, and the preset period is a quarter. The number of wearing times for the down jacket is zero. If the down jacket is taken as the clothes to be handled, it will be unreasonable. Therefore, the climate condition can be taken into consideration. Only clothes that meet the climate condition can be taken as the clothes to be handled.

In one example, before step 101, the method further includes:

capturing a dressing image for presenting a target user dressing clothes; recognizing at least one piece of clothes on the target user in the dressing image; when a first piece of clothes in the recognized at least one piece of clothes is a piece of clothes already being in the clothes library, increasing the number of wearing times for counting the number of times the first piece of clothes has been worn by 1; and when a second piece of clothes in the recognized at least one piece of clothes is a piece of clothes not being in the clothes library, adding the second piece of clothes into the clothes library, and setting the number of wearing times for the second piece of clothes to 1.

The method for recognizing the clothes in this example may be similar to a method for recognizing a human face, which will not be described in detail in this example.

Here, since the clothes worn by the user in the dressing image may not be completely displayed, and only a small portion thereof may be displayed. For example, a shirt is put inside a sweater, and the shirt can only show one collar, and therefore, the clothes worn by the user needs to be recognized from the collar. In general, when the user purchases new clothes, he or she will put on new clothes in front of the mirror.

In the present example, capturing a dressing image may be achieved by a dressing mirror. The dressing mirror is at least composed of a mirror and a camera. The camera is configured to photograph the user dressing clothes, and process the dressing image in its own processor, or send the dressing image to a device capable of processing it. The camera may be disposed behind the mirror, or around the mirror, as long as the camera can photograph the complete dressing image.

In one example, capturing a dressing image for presenting a target user dressing includes:

when it is detected that a user uses the dressing mirror, capturing an image in the dressing mirror; recognizing feature information of the user in the image; and when the recognized feature information of the user matches the feature information of the target user, capturing the dressing image.

If other user may also use the dressing mirror of the user, before capturing the dressing image, it is necessary to determine whether the user in front of the mirror is the target user. If the user in front of the mirror is the target user, the dressing image is captured; and if the user in front of the mirror is not the target user, the dressing image is not captured. If more than one person uses a common mirror together, a clothes library may be provided for each person. Each clothes library corresponds to feature information of a respective user. Each time before capturing the dressing image, it is necessary to first recognize which clothes library has the same user feature information as the feature information of the user in front of the mirror. If no such clothes library exists, the dressing image is not captured; and if such clothes library exits, the dressing image is captured and recognized, and the number of wearing times is updated according to the dressing image.

The user feature information may be a facial feature, a height feature, a voice, a fingerprint, an iris, etc., which is not specifically limited in the present disclosure.

Figure 2:
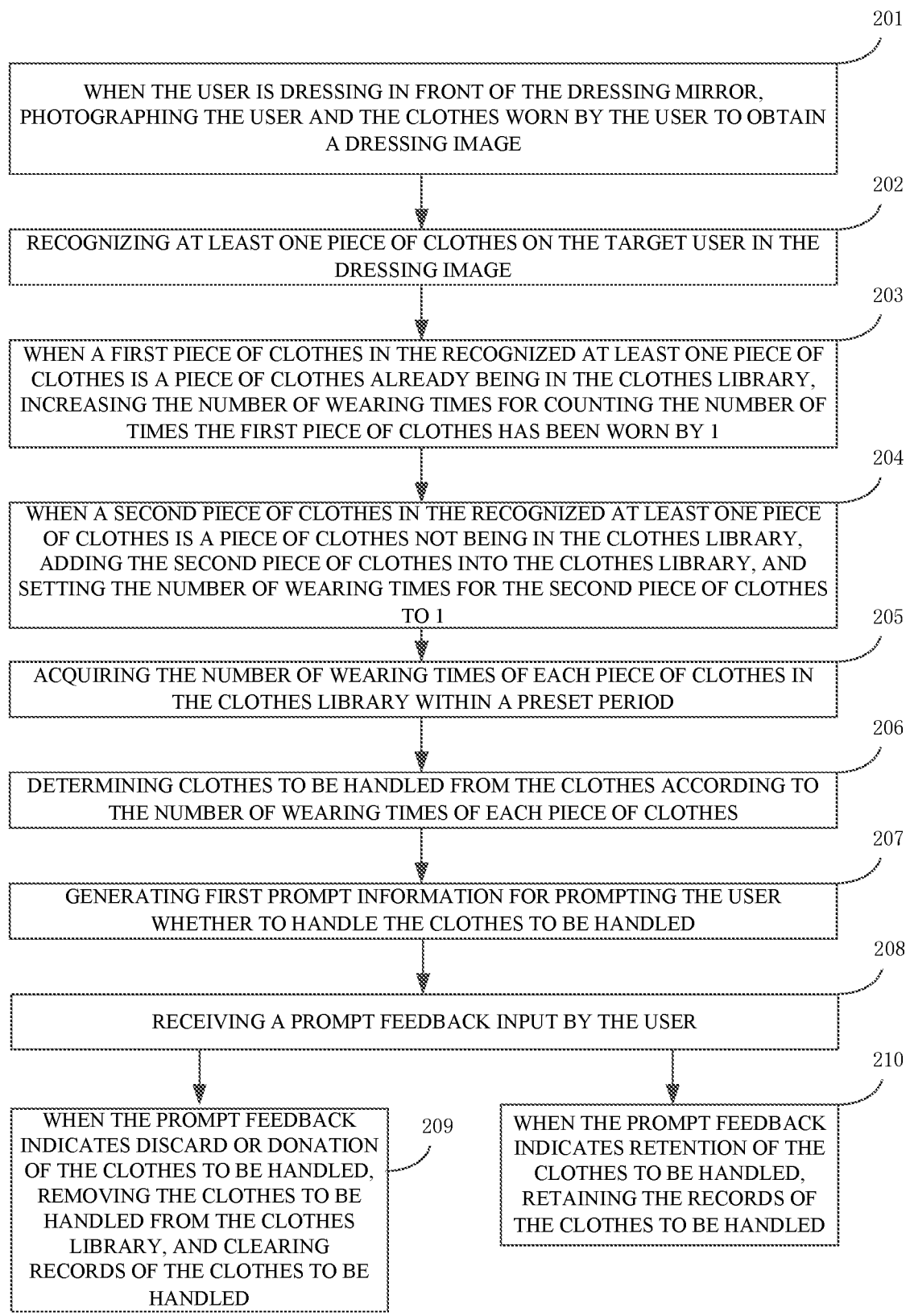
FIG. 2 is a flowchart illustrating a method for processing clothes information according to an example.

FIG. 2 is a flowchart illustrating a method for processing clothes information according to an example. As shown in FIG. 2, the method for processing clothes information is performed in a dressing mirror and includes the following steps 201-210.

In step 201, when the user is dressing in front of the dressing mirror, the user and the clothes worn by the user are photographed to obtain a dressing image.

In step 202, at least one piece of clothes on the target user is recognized from the dressing image.

In step 203, when a first piece of clothes in the recognized at least one piece of clothes is a piece of clothes already being in the clothes library, the number of wearing times for counting the number of times the first piece of clothes has been worn is increased by 1.

In step 204, when a second piece of clothes in the recognized at least one piece of clothes is a piece of clothes not being in the clothes library, the second piece of clothes is added into the clothes library, and the number of wearing times for the second piece of clothes is set to 1.

In step 205, the number of wearing times of each piece of clothes in the clothes library within a preset period is acquired.

The clothes library is a collection of information on clothes worn by a user captured by the dressing mirror; and the number of wearing times is a counted number of times of each piece of clothes being recognized as worn by the user.

In step 206, clothes to be handled are determined from the clothes according to the number of wearing times of each piece of clothes.

In step 207, first prompt information for prompting the user whether to handle the clothes to be handled is generated.

In step 208, a prompt feedback input by the user is received.

In step 209, when the prompt feedback indicates discard or donation of the clothes to be handled, the clothes to be handled are removed from the clothes library, and records of the clothes to be handled are cleared.

In step 210, when the prompt feedback indicates retention of the clothes to be handled, the records of the clothes to be handled are retained.

Here, a control panel may be provided on the dressing mirror, and the control panel may display the first prompt information.

In this example, it is more convenient for users to organize their own closets; and it is convenient for users to know the frequency of use of their clothes.

Figure 3:
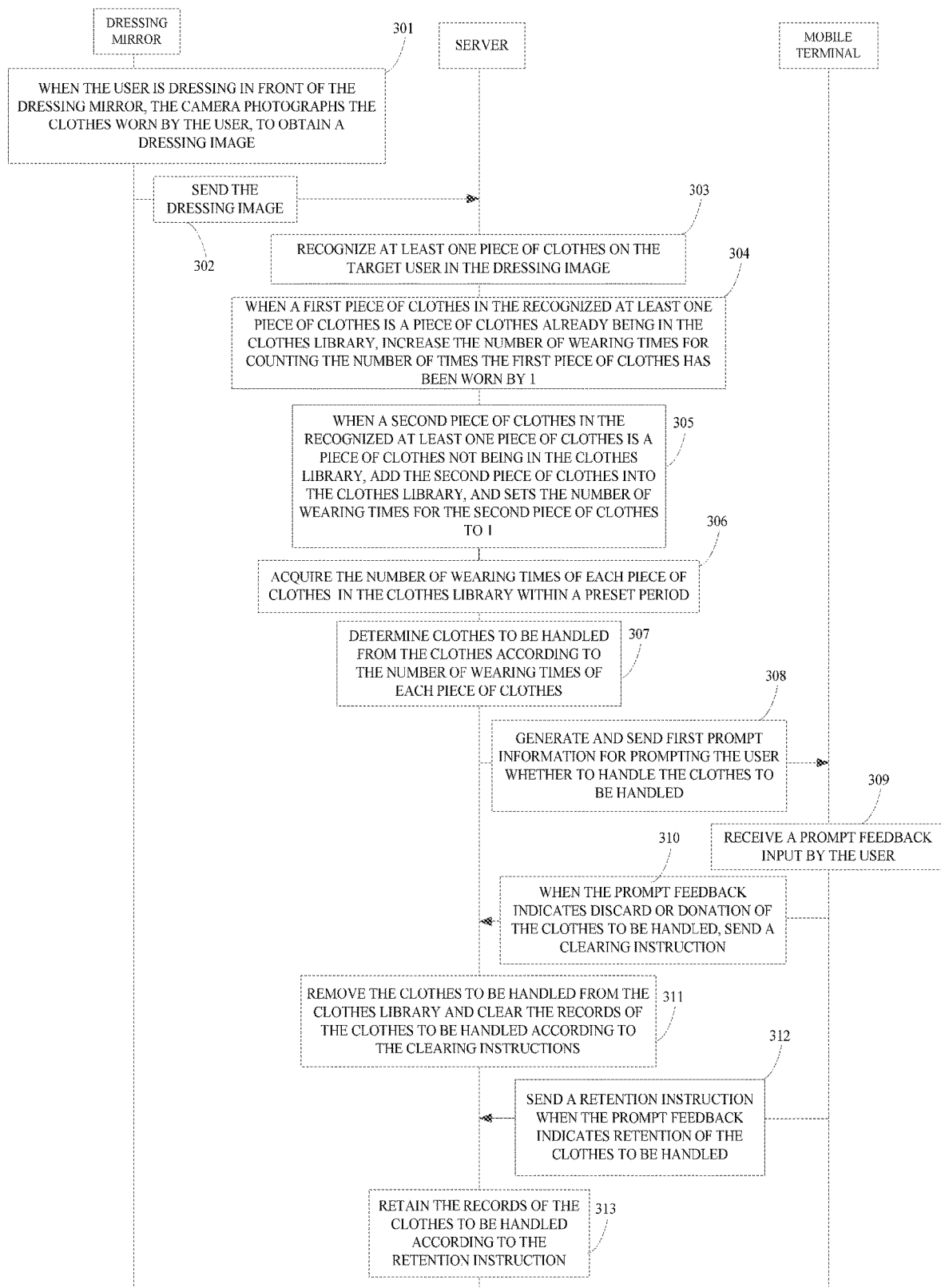
FIG. 3 is a flowchart illustrating a method for processing clothes information according to an example.

FIG. 3 is a flowchart illustrating a method for processing clothes information according to an example. As shown in FIG. 3, the method for processing clothes information is performed in a system for processing clothes information. The system includes a dressing mirror, a server, and a mobile terminal. The dressing mirror includes at least a mirror and a camera. The method includes the following steps 301-313.

In step 301, when the user is dressing in front of the dressing mirror, the camera of the dressing mirror photographs the clothes worn by the user, to obtain a dressing image.

In step 302, the dressing mirror sends the dressing image to the server.

In step 303, the server recognizes at least one piece of clothes on the target user in the dressing image.

In step 304, when a first piece of clothes in the recognized at least one piece of clothes is a piece of clothes already being in the clothes library, the server increases the number of wearing times for counting the number of times the first piece of clothes has been worn by 1.

In step 305, when a second piece of clothes in the recognized at least one piece of clothes is a piece of clothes not being in the clothes library, the server adds the second piece of clothes into the clothes library, and sets the number of wearing times for the second piece of clothes to 1.

In step 306, the server acquires the number of wearing times of each piece of clothes in the clothes library within a preset period.

The clothes library is a collection of information on clothes worn by a user captured by the dressing mirror; and the number of wearing times is a counted number of times of each piece of clothes being recognized as worn by the user.

In step 307, the server determines clothes to be handled from the clothes according to the number of wearing times of each piece of clothes.

In step 308, the server generates and sends to the terminal first prompt information for prompting the user whether to handle the clothes to be handled.

In step 309, the terminal receives a prompt feedback input by the user.

In step 310, when the prompt feedback indicates discard or donation of the clothes to be handled, the terminal sends a clearing instruction to the server.

The clearing instruction is used to remove the clothes to be handled from the clothes library, and clear records of the clothes to be handled.

In step 311, the server removes the clothes to be handled from the clothes library and clears the records of the clothes to be handled according to the clearing instructions.

In step 312, the terminal sends a retention instruction to the server when the prompt feedback indicates retention of the clothes to be handled.

In step 313, the server retains the records of the clothes to be handled according to the retention instruction.

In this example, the dressing mirror, the server, and the mobile terminal share the functions and work in cooperation. For the user, especially the female user, there are too many clothes, such that sometimes the user may forget a few pieces of clothes or only wear a few pieces of clothes. In this case, it can help to remind the user to do appropriate handling on clothes that are not frequently worn.

The following is a device example of the present disclosure and may be used to perform the method examples of the present disclosure.

Figure 4:
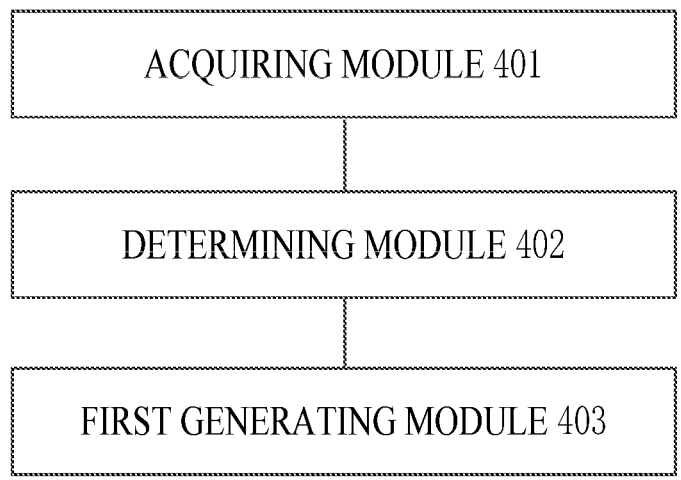
FIG. 4 is a block diagram illustrating a device for processing clothes information according to an example.

FIG. 4 is a block diagram illustrating a device for processing clothes information according to an example. The device may be implemented as a part or all of an electronic device through software, hardware, or a combination of both. As shown in FIG. 4, the device for processing clothes information includes:

an acquiring module 401 configured to acquire a number of wearing times of each piece of clothes in a clothes library within a preset period, wherein the clothes library is a collection of information on clothes worn by a user captured by a dressing mirror, and the number of wearing times is a counted number of times of each piece of clothes being recognized as worn by the user;

a determining module 402 configured to determine clothes to be handled from the clothes according to the number of wearing times of each piece of clothes; and a first generating module 403 configured to generate first prompt information for prompting the user whether to handle the clothes to be handled.

In this example, the device acquires clothes information captured by the dressing mirror; counts a number of wearing times of each piece of clothes; based on the number of wearing times, determines clothes to be handled; and prompts the user. In this way, it can not only timely notify the user about the wearing situation of the clothes, but also can facilitate the user to take appropriate handling measures on the clothes to be handled.

Figure 5:
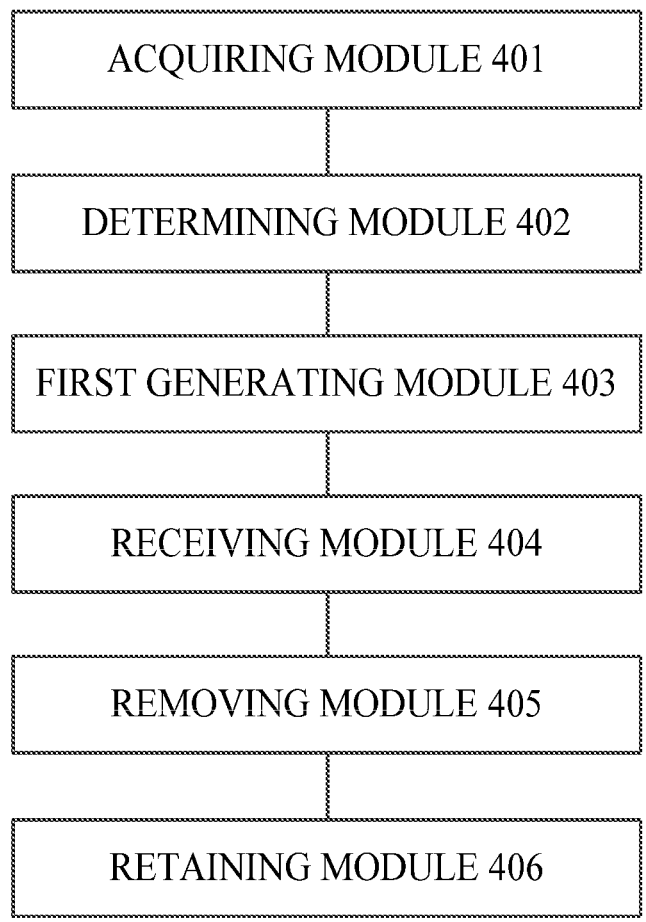
FIG. 5 is a block diagram illustrating a device for processing clothes information according to an example.

In one example, as shown in FIG. 5, the device further includes:

a receiving module 404 configured to receive a prompt feedback input by the user;

a removing module 405 configured to, when the prompt feedback indicates discard or donation of the clothes to be handled, remove the clothes to be handled from the clothes library, and clear records of the clothes to be handled; and a retaining module 406 configured to, when the prompt feedback indicates retention of the clothes to be handled, retain the records of the clothes to be handled.

Figure 6:
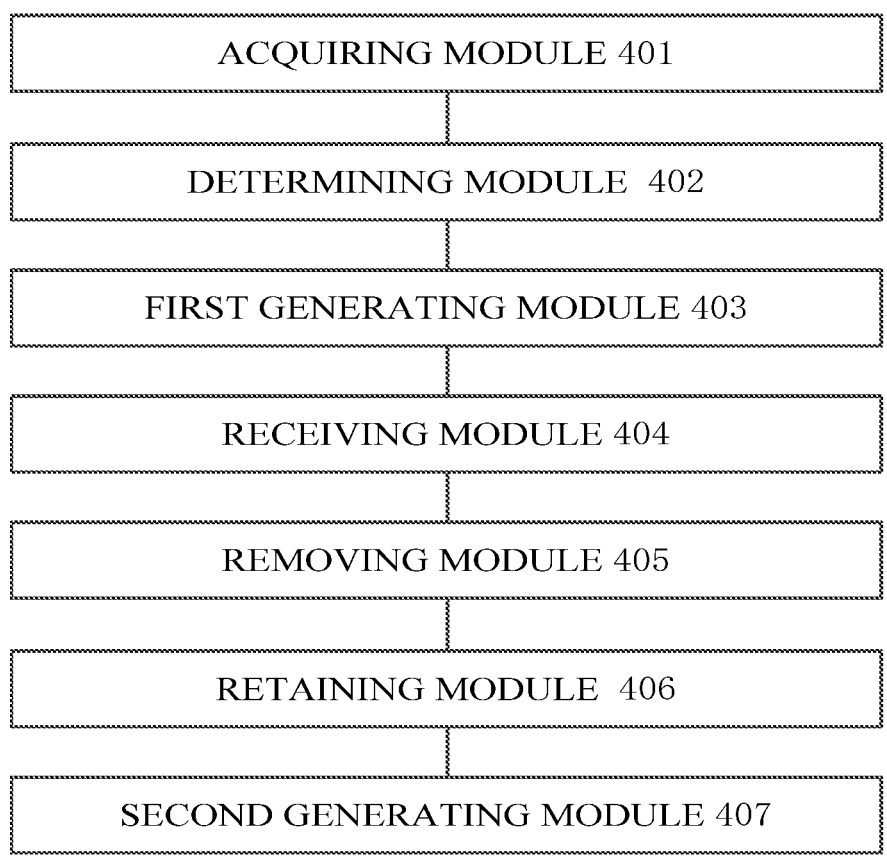
FIG. 6 is a block diagram illustrating a device for processing clothes information according to an example.

In one example, as shown in FIG. 6, the device further includes:

a second generating module 407 configured to, when the prompt feedback indicates donation of the clothes to be handled, generate second prompt information, wherein the second prompt information prompts the user of information about a donation channel.

Figure 7:
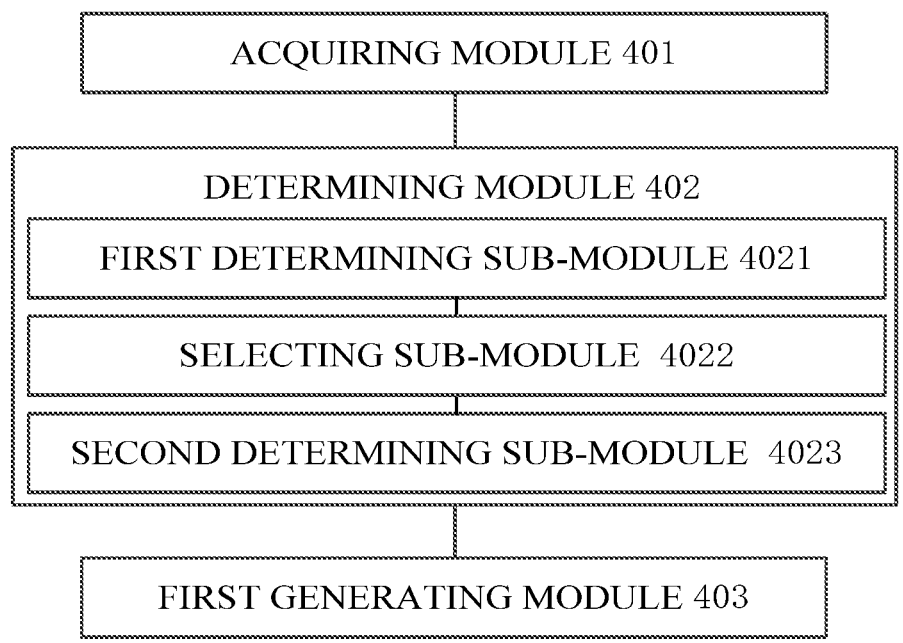
FIG. 7 is a block diagram illustrating a device for processing clothes information according to an example.

In one example, as shown in FIG. 7, the determining module 402 includes:

a first determining sub-module 4021 configured to determine a current climate condition;

a selecting sub-module 4022 configured to select a piece of infrequently worn clothes, that meets the current climatic condition and has a number of wearing times less than a preset number of times, from the clothes; and a second determining sub-module 4023 configured to determine the piece of infrequently worn clothes as the clothes to be handled.

Figure 8:
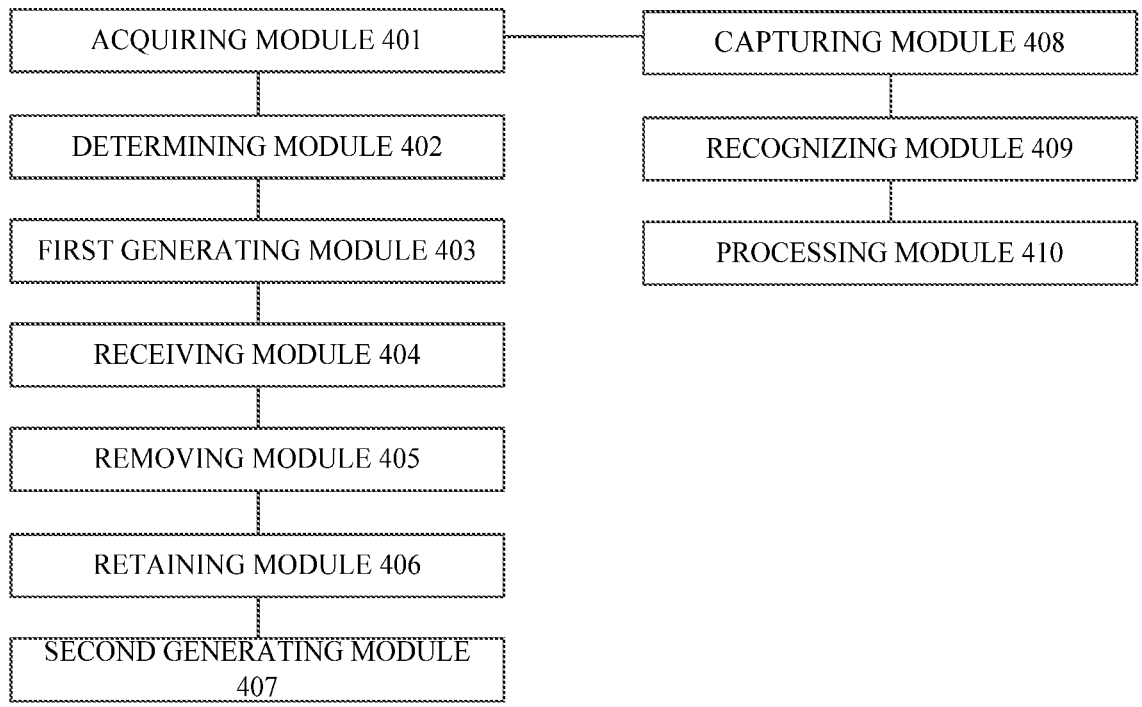
FIG. 8 is a block diagram illustrating a device for processing clothes information according to an example.

In one example, as shown in FIG. 8, the device further includes:

a capturing module 408 configured to capture a dressing image for presenting a target user dressing clothes;

a recognizing module 409 configured to recognize at least one piece of clothes on the target user in the dressing image;

a processing module 410 configured to, when a first piece of clothes in the recognized at least one piece of clothes is a piece of clothes already being in the clothes library, increase the number of wearing times for counting the number of times the first piece of clothes has been worn by 1; and when a second piece of clothes in the recognized at least one piece of clothes is a piece of clothes not being in the clothes library, add the second piece of clothes into the clothes library, and set the number of wearing times for the second piece of clothes to 1.

Figure 9:
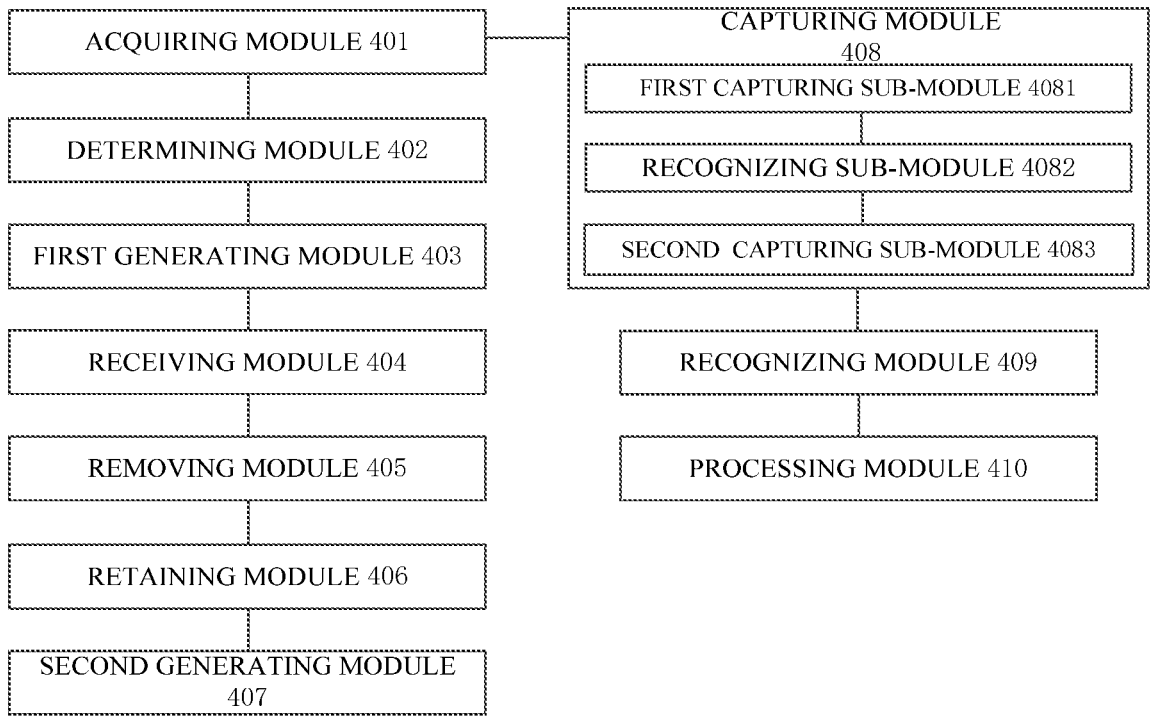
FIG. 9 is a block diagram illustrating a device for processing clothes information according to an example.

In one example, as shown in FIG. 9, the capturing module 408 includes:

a first capturing sub-module 4081 configured to, when it is detected that a user uses the dressing mirror, capture an image in the dressing mirror;

a recognizing sub-module 4082 configured to recognize feature information of the user in the image; and a second capturing sub-module 4083 configured to, when the recognized feature information of the user matches the feature information of the target user, capture the dressing image.

According to a fourth aspect of the examples of the present disclosure, there is provided a device for processing clothes information. The device includes:

a processor; and a memory for storing instructions executable by the processor;

wherein the processor is configured to:

acquire a number of wearing times of each piece of clothes in a clothes library within a preset period, wherein the clothes library being a collection of information on clothes worn by a user captured by a dressing mirror, and the number of wearing times is a counted number of times of each piece of clothes being recognized as worn by the user;

determine clothes to be handled from the clothes according to the number of wearing times of each piece of clothes; and generate first prompt information for prompting the user whether to handle the clothes to be handled.

With respect to the devices in the above examples, the specific manners for performing operations for individual modules therein have been described in detail in the examples regarding the relevant methods, which will not be elaborated herein.

Figure 10:
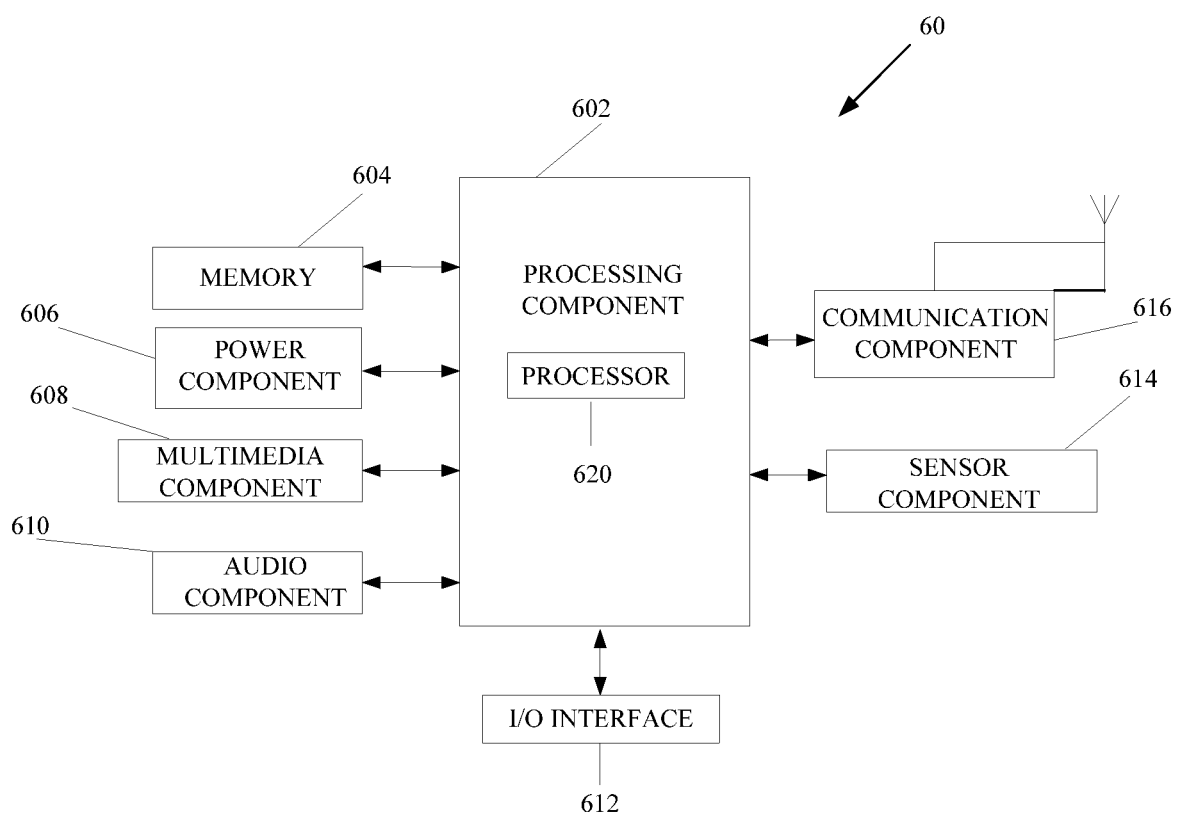
FIG. 10 is a block diagram illustrating a device for processing clothes information according to an example.

FIG. 10 is a block diagram illustrating a structure of a device 60 for processing clothes information according to an example. The device 60 is applied in a terminal device. For example, the device 60 may be a dressing mirror, a mobile phone, a computer, a gaming console, a tablet, a medical device, exercise equipment, a personal digital assistant, and the like.

The device 60 may include one or more of the following components: a processing component 602, a memory 604, a power component 606, a multimedia component 608, an audio component 610, an input/output (I/O) interface 66, a sensor component 614, and a communication component 616.

The processing component 602 typically controls overall operations of the device 60, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the device 60. Examples of such data include instructions for any applications or methods operated on the device 60, contact data, phonebook data, messages, pictures, video, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the device 60. The power component 606 may include a power management system, one or more power sources, and any other components associated with the generation, management, and distribution of power in the device 60.

The multimedia component 608 includes a screen providing an output interface between the device 60 and the user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some examples, the multimedia component 608 includes a front camera and/or a rear camera. The front camera and/or the rear camera may receive an external multimedia datum while the device 60 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone ("MIC") configured to receive an external audio signal when the device 60 is in an operation mode, such as a call mode, a recording mode, and a voice recognition mode. The received audio signal may be further stored in the memory 604 or transmitted via the communication component 616. In some examples, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the device 60. For instance, the sensor component 614 may detect an open/closed status of the device 60, relative positioning of components, e.g., the display and the keypad, of the device 60, a change in position of the device 60 or a component of the device 60, a presence or absence of user contact with the device 60, an orientation or an acceleration/deceleration of the device 60, and a change in temperature of the device 60. The sensor component 614 may include a proximity sensor configured to detect the presence of nearby objects without any physical contact. The sensor component 614 may also include a light sensor, such as a CMOS or CCD image sensor, for use in imaging applications. In some examples, the sensor component 614 may also include an accelerometer sensor, a gyroscope sensor, a magnetic sensor, a pressure sensor, or a temperature sensor.

The communication component 616 is configured to facilitate communication, wired or wirelessly, between the device 60 and other devices. The device 60 can access a wireless network based on a communication standard, such as WiFi, 2G, or 3G, or a combination thereof. In one example, the communication component 616 receives a broadcast signal or broadcast associated information from an external broadcast management system via a broadcast channel. In one example, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In examples, the device 60 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing any of the above described methods.

In examples, there is also provided a non-transitory computer-readable storage medium including instructions, such as included in the memory 604, executable by the processor 620 in the device 60, for performing any of the methods for processing information at the terminal. For example, the non-transitory computer-readable storage medium may be a ROM, a RAM, a CD-ROM, a magnetic tape, a floppy disc, an optical data storage device, and the like.

Figure 11:
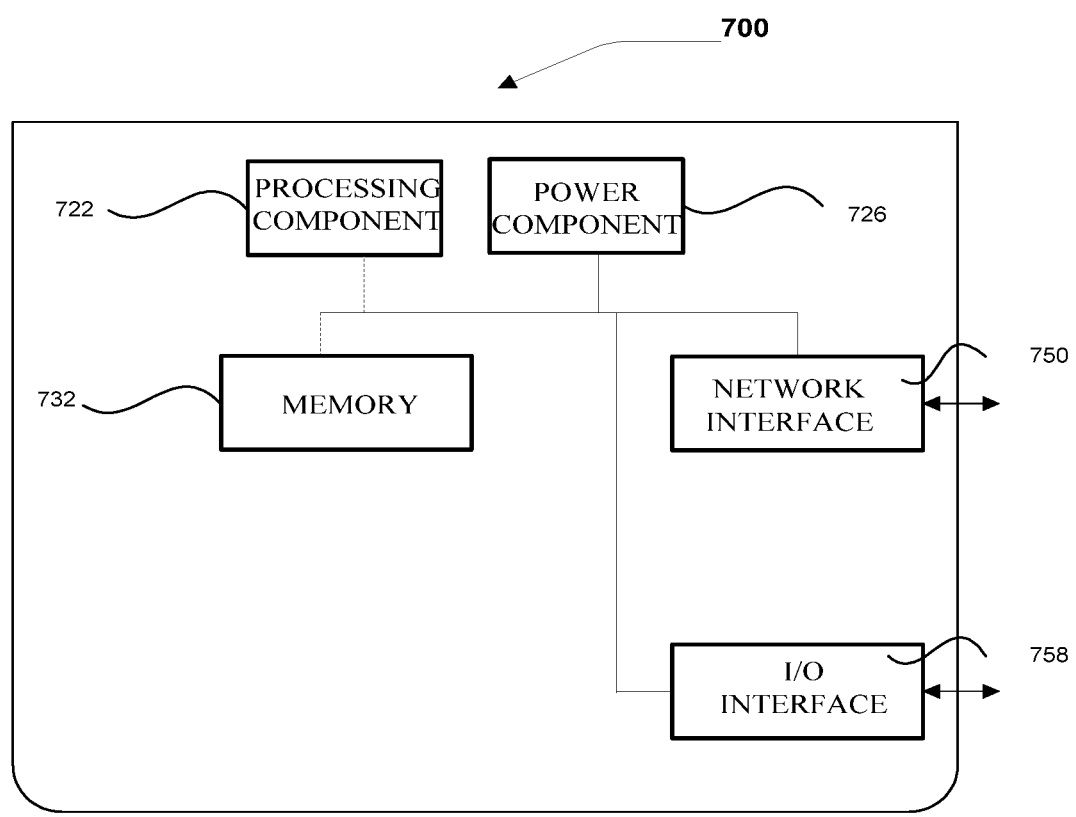
FIG. 11 is a block diagram illustrating a device for processing clothes information according to an example.

FIG. 11 is a block diagram of a device 700 for processing clothes information according to an example. For example, the device 700 may be provided as a server. The device 700 includes a processing component 722 that further includes one or more processors, and memory resources represented by a memory 732 for storing instructions executable by the processing component 722, such as application programs. The application programs stored in the memory 732 may include one or more modules each corresponding to a set of instructions. Further, the processing component 722 is configured to execute the instructions to perform the above described methods.

The device 700 may also include a power component 726 configured to perform power management of the device 700, wired or wireless network interface(s) 750 configured to connect the device 700 to a network, and an input/output (I/O) interface 758. The device 700 may operate based on an operating system stored in the memory 732, such as Windows Server™, Mac OS X™, Unix™, Linux™, FreeBSD™, or the like.

There is provided a non-transitory computer readable storage medium that, when instructions in the storage medium are executed by the processor of the device 700, causes the device 700 to perform the above described methods for processing clothes information. The method includes:

acquiring a number of wearing times of each piece of clothes in a clothes library within a preset period, wherein the clothes library is a collection of information on clothes worn by a user captured by a dressing mirror, and the number of wearing times is a counted number of times of each piece of clothes being recognized as worn by the user;

determining clothes to be handled from the clothes according to the number of wearing times of each piece of clothes; and generating first prompt information for prompting the user whether to handle the clothes to be handled.

With this technical solution disclosed herein, it can timely notify the user about the wearing situation of the clothes, and facilitate the user to take appropriate handling measures on the clothes to be handled.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

Other examples of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof.

What is claimed is:

1. A method for processing clothes information, comprising:
    acquiring a number of wearing times for each piece of clothes in a clothes library within a preset time period, wherein the clothes library comprises a collection of information on clothes worn that is captured using a dressing mirror, and the number of wearing times is a counted number of times for each piece of clothes worn;
    identifying clothes to be handled according to the number of wearing times for each piece of clothes;
    generating first prompt information for prompting to handle the identified clothes; receiving a prompt feedback comprising one of a first prompt feedback and a second prompt feedback, wherein the first prompt feedback indicates discard or donation of the clothes and the second prompt feedback indicates retention of the clothes; and
    after the first prompt information is generated for prompting to handle the identified clothes, removing the clothes to be handled from the clothes library and clearing records of the clothes to be handled in response to receiving the prompt feedback comprising the first prompt feedback; retaining the records of the clothes to be handled in response to receiving the prompt feedback comprising the second prompt feedback.

2. The method according to claim 1, further comprising:
    in response to the second prompt feedback indicating the donation of the clothes to be handled, generating second prompt information, wherein the second prompt information comprises information about a donation channel.

3. The method according to claim 1, wherein identifying the clothes to be handled according to the number of wearing times for each piece of clothes comprises:
    determining a current climate condition;
    selecting a piece of infrequently worn clothes that meets the current climate condition and has a number of wearing times that is less than a preset number of times; and
    determining the piece of infrequently worn clothes as the clothes to be handled.

4. The method according to claim 1, wherein, before acquiring the number of wearing times for each piece of clothes worn, the method further comprises:
    capturing a dressing image for presenting a target user in dressing clothes;
    recognizing at least one piece of clothes on the target user in the dressing image;
    when a first piece of clothes in the at least one piece of clothes is in the clothes library, increasing the number of wearing times for the first piece of clothes that has been worn by 1; and
    when a second piece of clothes in the at least one piece of clothes is not in the clothes library, adding the second piece of clothes into the clothes library, and setting the number of wearing times for the second piece of clothes to 1.

5. The method according to claim 4, wherein capturing the dressing image for presenting the target user in the dressing clothes comprises:
    when it is detected that a user uses the dressing mirror, capturing an image in the dressing mirror;
    recognizing feature information of the user in the image; and
    when the recognized feature information of the user matches the feature information of the target user, capturing the dressing image.

6. A device for processing clothes information, comprising:
    a processor; and
    a memory for storing instructions executable by the processor;
    wherein the processor is configured to:
        acquire a number of wearing times for each piece of clothes in a clothes library within a preset time period, wherein the clothes library comprises a collection of information on clothes worn that is captured using a dressing mirror, and the number of wearing times is a counted number of times for each piece of clothes;
        identify clothes to be handled according to the number of wearing times for each piece of clothes;

generate first prompt information for prompting to handle the identified clothes;

receive a prompt feedback comprising one of a first prompt feedback and a second prompt feedback, wherein the first prompt feedback indicates discard or donation of the clothes and the second prompt feedback indicates retention of the clothes; and after the first prompt information is generated for prompting to handle the identified clothes, in response to receiving the prompt feedback comprising the first prompt feedback, remove the clothes to be handled from the clothes library, and clear records of the clothes to be handled; in response to receiving the prompt feedback comprising the second prompt feedback, retain the records of the clothes to be handled.

7. The device according to claim 6, wherein the processor is further configured to:

in response to the second prompt feedback indicating the donation of the clothes to be handled, generate second prompt information, wherein the second prompt information comprises information about a donation channel.

8. The device according to claim 6, wherein the processor is further configured to:

determine a current climate condition;

select a piece of infrequently worn clothes, that meets the current climate condition and has a number of wearing times that is less than a preset number of times; and determine the piece of infrequently worn clothes as the clothes to be handled.

9. The device according to claim 6, wherein, before the number of wearing times for each piece of clothes worn by the user is acquired, the processor is further configured to:

capture a dressing image for presenting a target user in dressing clothes;

recognize at least one piece of clothes on the target user in the dressing image;

when a first piece of clothes in the at least one piece of clothes is in the clothes library, increase the number of wearing times for the first piece of clothes that has been worn by 1; and when a second piece of clothes in the at least one piece of clothes is not in the clothes library, add the second piece of clothes into the clothes library, and set the number of wearing times for the second piece of clothes to 1.

10. The device according to claim 9, wherein the processor is further configured to:

when it is detected that a user uses the dressing mirror, capture an image in the dressing mirror;

recognize feature information of the user in the image; and when the recognized feature information of the user matches the feature information of the target user, capture the dressing image.

11. A non-transitory computer readable storage medium having stored thereon a computer program that, when being executed by a processor, performs acts comprising:

acquiring a number of wearing times for each piece of clothes in a clothes library within a preset time period, wherein the clothes library comprises a collection of information on clothes worn that is captured using a dressing mirror, and the number of wearing times is a counted number of times for each piece of clothes worn;

identifying clothes to be handled according to the number of wearing times for each piece of clothes;

generating first prompt information for prompting to handle the identified clothes;

receiving a prompt feedback comprising one of a first prompt feedback and a second prompt feedback, wherein the first prompt feedback indicates discard or donation of the clothes and the second prompt feedback indicates retention of the clothes;

after the first prompt information is generated for prompting to handle the identified clothes, in response to receiving the prompt feedback comprising the first prompt feedback, removing the clothes to be handled from the clothes library, and clearing records of the clothes to be handled; in response to receiving the prompt feedback comprising the second prompt feedback, retaining the records of the clothes to be handled.

12. The non-transitory computer readable storage medium according to claim 11, wherein, when being executed by the processor, the computer program further performs:

in response to the second prompt feedback indicating the donation of the clothes to be handled, generating second prompt information, wherein the second prompt information comprises information about a donation channel.

13. The non-transitory computer readable storage medium according to claim 11, wherein when being executed by the processor, the computer program further performs:

determining a current climate condition;

selecting a piece of infrequently worn clothes that meets the current climate condition and has a number of wearing times that is less than a preset number of times; and determining the piece of infrequently worn clothes as the clothes to be handled.

14. The non-transitory computer readable storage medium according to claim 11, wherein, when being executed by the processor, the computer program further performs:

capturing a dressing image for presenting a target user in dressing clothes;

recognizing at least one piece of clothes on the target user in the dressing image;

when a first piece of clothes in the at least one piece of clothes is in the clothes library, increasing the number of wearing times for the first piece of clothes that has been worn by 1; and when a second piece of clothes in the at least one piece of clothes is not in the clothes library, adding the second piece of clothes into the clothes library, and setting the number of wearing times for the second piece of clothes to 1.

15. The non-transitory computer readable storage medium according to claim 14, wherein, when being executed by the processor, the computer program further performs:

when it is detected that a user uses the dressing mirror, capturing an image in the dressing mirror;

recognizing feature information of the user in the image; and when the recognized feature information of the user matches the feature information of the target user, capturing the dressing image.

* * * * *